United States Patent [19]

Maier et al.

[11] Patent Number: 4,513,853

[45] Date of Patent: Apr. 30, 1985

[54] COOLING BED CONSTRUCTION

[75] Inventors: Otto H. Maier; James F. Seifert; John C. Ryder, all of Massillon; William F. Grisez, Canton, all of Ohio

[73] Assignee: Maier Enterprises, Inc., Massillon, Ohio

[21] Appl. No.: 424,046

[22] Filed: Sep. 27, 1982

[51] Int. Cl.³ .............................................. B65G 47/24
[52] U.S. Cl. .................................... 198/410; 198/774
[58] Field of Search ................................ 198/774, 410

[56] References Cited

U.S. PATENT DOCUMENTS

| | | | |
|---|---|---|---|
| 1,441,042 | 1/1923 | Thackray | 198/774 |
| 3,128,651 | 4/1964 | Peterson | 198/774 |
| 3,154,191 | 10/1964 | Schmidt | 198/774 |
| 3,332,539 | 7/1967 | Buchheit | 198/774 |
| 3,417,858 | 12/1968 | Heard | 198/774 |
| 3,462,004 | 8/1969 | Hill | 198/774 |
| 3,746,146 | 7/1973 | Buchheit | 198/774 |
| 3,762,538 | 10/1973 | Buchheit | 198/774 |
| 4,040,514 | 8/1977 | Pielsticker et al. | 198/774 |
| 4,135,704 | 1/1979 | Elhaus | 198/774 |
| 4,151,907 | 5/1979 | Doty | 198/774 |

FOREIGN PATENT DOCUMENTS

| | | | |
|---|---|---|---|
| 402873 | 3/1943 | Italy | 198/410 |
| 593997 | 5/1959 | Italy | 198/774 |

*Primary Examiner*—Joseph E. Valenza
*Assistant Examiner*—Kyle E. Shane
*Attorney, Agent, or Firm*—Michael Sand Co.

[57] ABSTRACT

A walking beam conveyor of the type having a plurality of reciprocally movable notched beams interposed between a plurality of fixed notched beams, cools and transfers elongated articles such as cylindrical bar stock between a furnace and a discharge station. Vertical and horizontal reciprocal motions are applied simultaneously to the movable beams by eccentrics which are mounted on a single drive shaft for advancing the bars along the fixed beams toward the discharge end of the cooling bed. The vertical motion eccentric is operatively connected to the movable beam through a bellcrank lever and the horizontal motion eccentric is connected by a generally horizontal push-pull connection. The beam notches are V-shaped with one sloped surface having a greater length and smaller angle of slope than the other sloped surface. Rotation of the drive shaft in one direction will reciprocate the movable beams causing the bars to rotate 90° and advance one notch position along the fixed beam for each rotational cycle of the eccentrics. Rotation of the drive shaft in the opposite direction will rotate each bar 90° in its respective notch without advancing the bars to the adjacent notch upon each rotational cycle of the eccentrics.

12 Claims, 23 Drawing Figures

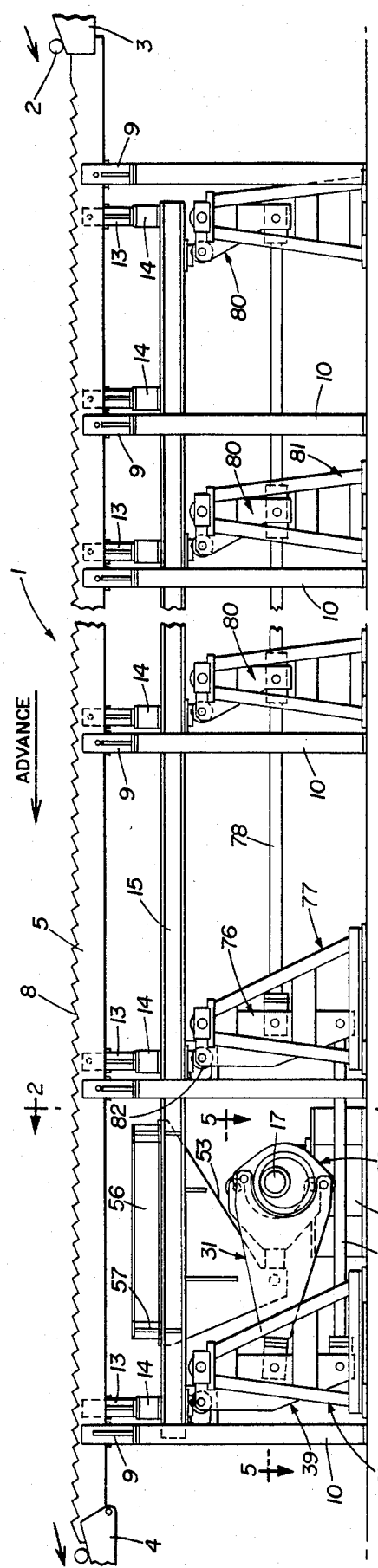
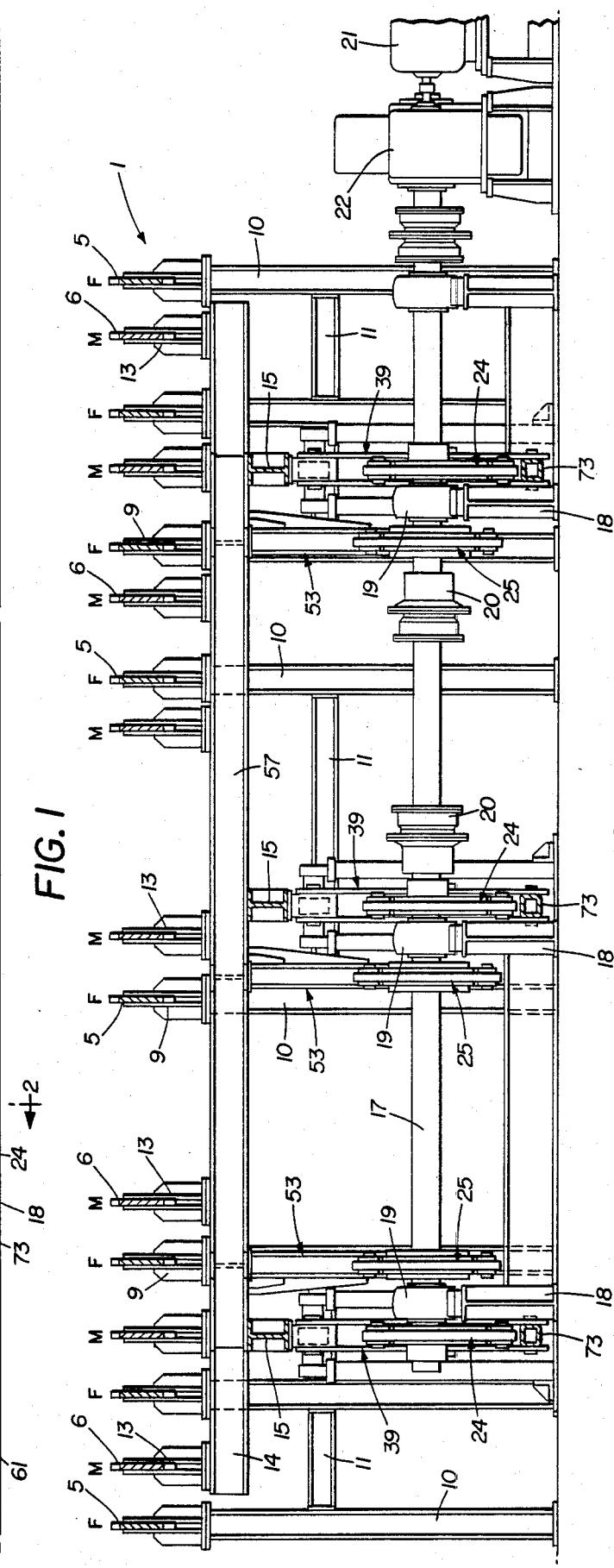
FIG. 1
FIG. 2

FIG. 4

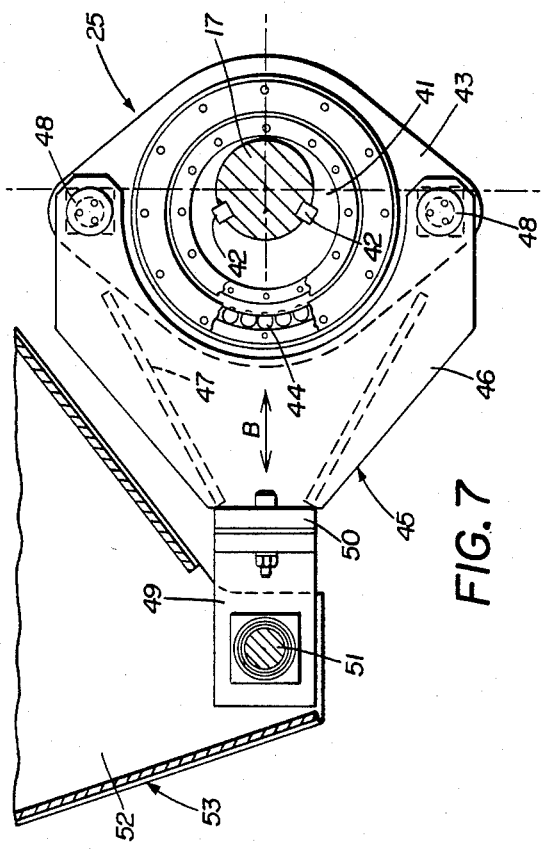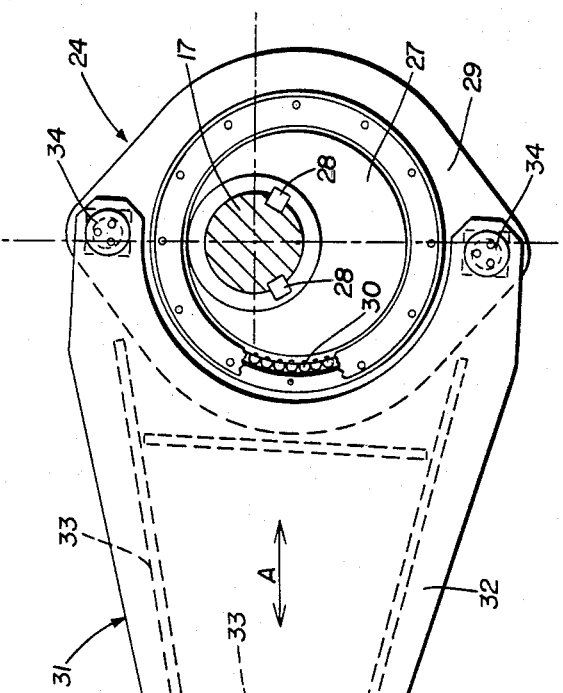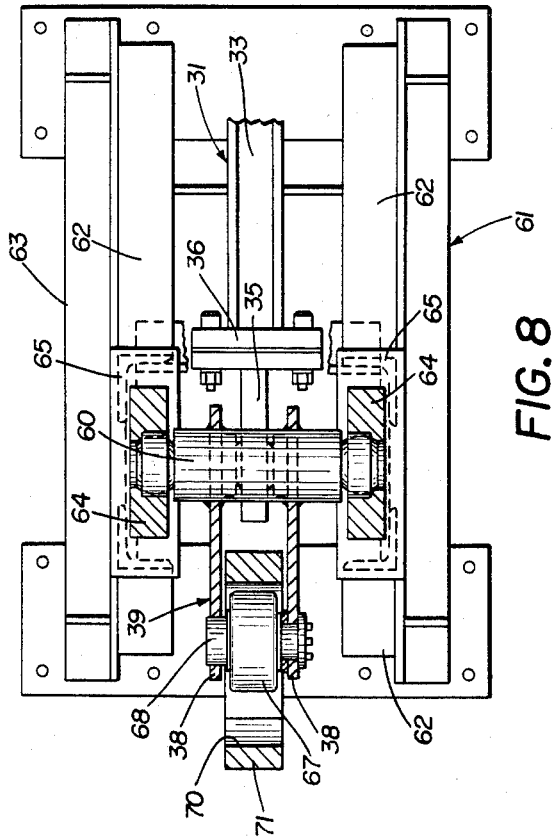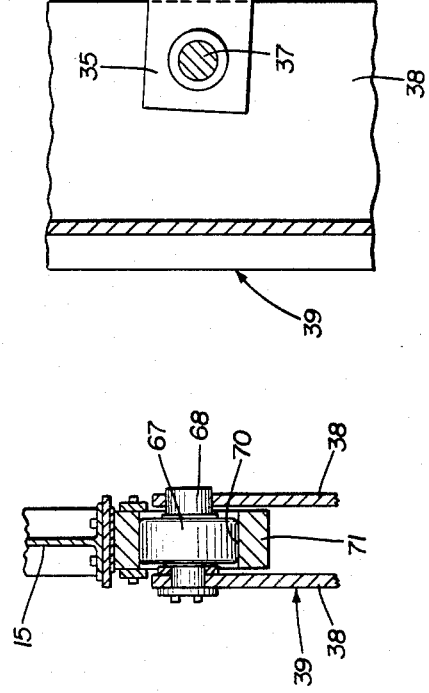
FIG. 7
FIG. 6
FIG. 8
FIG. 9

COOLING BED CONSTRUCTION

BACKGROUND OF THE INVENTION

1. Field of the Invention

The invention relates to walking beam conveyors for moving elongated pieces of materials and particularly to a walking beam type of cooling bed in which heated round bars are moved along fixed, notched beams by reciprocating notched beams. More particularly, the invention relates to an improved drive mechanism for the reciprocating beams which in addition to advancing the bars along the fixed beams and rotating them 90° will rotate the bars 90° in their respective notches without advancing them.

2. Description of the Prior Art

Walking beam types of conveyors have been used for many years for the transporting of materials such as billets, ingots, round and rectangularly shaped bars and the like for heating and cooling purposes. These walking beam conveyors consist of a plurality of fixed beams having notches formed therein in combination with a plurality of reciprocally movable notched beams which are interposed in-between the fixed beams.

A drive mechanism is connected to the moving beam and imparts various types of motions thereto depending upon the particular design and function of the conveyor for advancing the heated or cooled material. The materials are located each in a respective notch and move successively along the notches of the fixed beam until they are discharged at one end thereof. In a cooling bed application the material generally is cooled by ambient air as the material moves along the cooling bed. Other of these walking beam conveyors when used for heating purposes transfer material through a heating chamber or furnace. Certain of these known cooling beds will turn or rotate the material as it is advanced along successive notches to prevent bending of the material due to its heated state.

Some examples of these prior art walking beam conveyors, many of which are used for either heating or cooling of material, are shown in U.S. Pat. Nos. 3,003,615, 3,128,651, 3,332,539, 3,417,858, 3,462,004, 3,648,827, 3,744,620, 3,746,146, 4,040,514, 4,102,449 and 4,135,704. These known walking beam conveyors use a variety of mechanisms for connecting a drive means with the movable notched beam. Certain of these prior conveyors use eccentrics and various cam arrangements for engaging and driving the movable beam. Still others use various bellcrank and other types of levers and connecting linkages for imparting this movement to the movable beam. Furthermore many of these prior constructions use a dual motion arrangement wherein the drive mechanism imparts both a vertical and horizontal motion to the beam which results in a circular-type motion thereto for picking up the material from its particular notch and depositing it in the adjacent notch toward the discharge end of the conveyor.

One shortcoming of these known walking beam conveyors is that the drive mechanism of the movable beam is relatively complicated and expensive due to the multiple drive shafts and connecting linkages to the movable beam. As discussed above, these walking beam conveyors, in addition to advancing the materials along the cooling bed between the deposit and discharge ends, also will rotate the material to prevent the material from bending or drooping downwardly due to the heated state of the material. If the material was transferred along a cooling bed without rotation, the ends and unsupported intermediate areas of the material would deform due to the weight thereof.

This material deformation becomes an extremely serious problem when the movement of the material longitudinally along the conveyor is stopped for any reason, such as a problem at the discharge end due to an excessive accumulation of discharged materials or some type of malfunction or equipment breakdown.

Thus, the need has existed for a walking beam conveyor and in particular for such a conveyor that is used as a cooling bed which has a single drive shaft and associated drive mechanism for reciprocating the moving beam to move the material longitudinally along the fixed beams and which also enables the material to be rotated within their respective notches without advancement along the bed. There is no known cooling bed construction of which we are aware which achieves these advantages.

SUMMARY OF THE INVENTION

Objectives of the invention include providing an improved cooling bed construction of the type having a plurality of longitudinally extending, spaced parallel, fixed notched beams with a plurality of movable notched beams being interposed therebetween for moving elongated round bar material along the notches of the fixed beams from a deposit end to a discharge end, and in which a drive mechanism is provided for reciprocating the movable beams which includes a single shaft and a plurality of eccentrics mounted on the shaft. Another objective is to provide such a cooling bed in which the drive shaft eccentrics are mounted and positioned in a relative manner and some are operatively connected to the movable beams by bellcrank levers for imparting a vertical reciprocal motion component to the beams and the others by push-pull levers for imparting a horizontal reciprocal motion component to the beams whereupon the combined motions produce a circular motion on the beams whereby the bars are picked up from the notches of the fixed beams and deposited in the adjacent notches downstream for each complete cycle of the eccentrics.

A still further objective of the invention is to provide such a cooling bed in which the notched beams have similar V-shaped notches with one of the sloped surfaces having a longer length and smaller angle of inclination than the length and slope of the second surface, and in which the notch surfaces and angles are proportional to the diameter of the cylindrical bars to be moved thereby, whereby rotation of the beam actuating eccentrics throughout one cycle in an advance forward direction will pick the bars out of their respective fixed beam notches and lift them vertically upwardly and horizontally forwardly over the peaks of adjacent notches, during which movement the bars will be rotated approximately 90°, whereupon continued reciprocal movement of the movable beams will place the bars in the valleys of the next adjacent notches. A further objective is to provide such a cooling bed in which the moving beams when reciprocated in a second or opposite direction by reverse rotation of the single drive shaft, will lift the bars up from the bases of the notches of the fixed beam and move them upwardly and rearwardly along and above the longer sloped surfaces to a point adjacent to, but short of, the V-shaped peaks so that upon continued rotational movement of the movable beams the bars will roll backwardly to the base of the V-shaped notches from which they were removed rotating 90° during their returned descent without advancement to an adjacent notch in the fixed beams.

A still further objective of the invention is to provide such a cooling bed in which the single drive shaft is connected to an electric drive motor by a gear reducer and the drive shaft is located adjacent to the discharge end of the cooling bed, in which the horizontal motion component producing eccentrics are connected to the movable notched beams at spaced transverse positions along the drive shaft by a plurality of longitudinally extending motion beams, one for each of said horizontal eccentrics, and in which the motion beams are connected to the notched beams by a plurality of cross beams spaced longitudinally along the motion beams and connected to the notched beams by a plurality of brackets. Another objective is to provide such a cooling bed in which the vertical motion component producing eccentrics are engageable with the motion beams by bellcranks and rollers mounted at the pivoting ends of the bellcranks, in which a plurality of these bellcranks are spaced transversely and longitudinally along the length of the cooling bed, and in which the longitudinally spaced bellcranks are interconnected by rigid push rods whereby the motion from the drive shaft to the associated bellcranks is transmitted to all of the bellcranks spaced throughout the length of the cooling bed.

Another objective is to provide such a cooling bed which eliminates difficulties heretofore encountered with known walking beam conveyors, especially of the type used for cooling purposes, and which achieves the stated objectives simply and effectively and solves problems and satisfies needs existing in the art.

These objectives and advantages are obtained by the improved cooling bed construction, the general nature of which may be stated as being of the type having a series of parallel, longitudinally horizontally extending notched beams, certain of which are fixed and certain others being reciprocally movable for advancing elongated bar material progressively along the fixed beams toward a discharge end, wherein the improvement includes drive means having a single drive shaft extending transversely beneath the beams and first and second eccentric means mounted on the drive shaft and operatively connected to the movable beam for imparting reciprocal movement to the movable beams upon rotation of said drive shaft; and a series of notch means each defined by a pair of sloped surfaces, formed on the beams for holding the bars of material and for advancing said bars toward the discharge end upon reciprocal movement of the movable beams by rotation of the drive shaft in one direction and for turning the bars within their respective notch means without advancement upon rotation of the drive shaft in an opposite direction.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 1 is a fragmentary side elevational view of the cooling bed construction;

FIG. 2 is an enlarged sectional view taken on line 2—2, FIG. 1;

FIG. 4 is an enlarged fragmentary elevational view of the left hand end portion of the cooling bed as shown in FIG. 1 with portions broken away;

FIG. 6 is a fragmentary sectional view with portions broken away, taken on line 6—6, FIG. 5;

FIG. 7 is a fragmentary sectional view with portions broken away, taken on line 7—7, FIG. 5;

FIG. 8 is an enlarged sectional view taken on line 8—8, FIG. 4;

FIG. 9 is an enlarged fragmentary sectional view taken on line 9—9, FIG. 4;

Similar numerals refer to similar parts throughout the drawings.

DESCRIPTION OF THE PREFERRED EMBODIMENT

Figure 3:
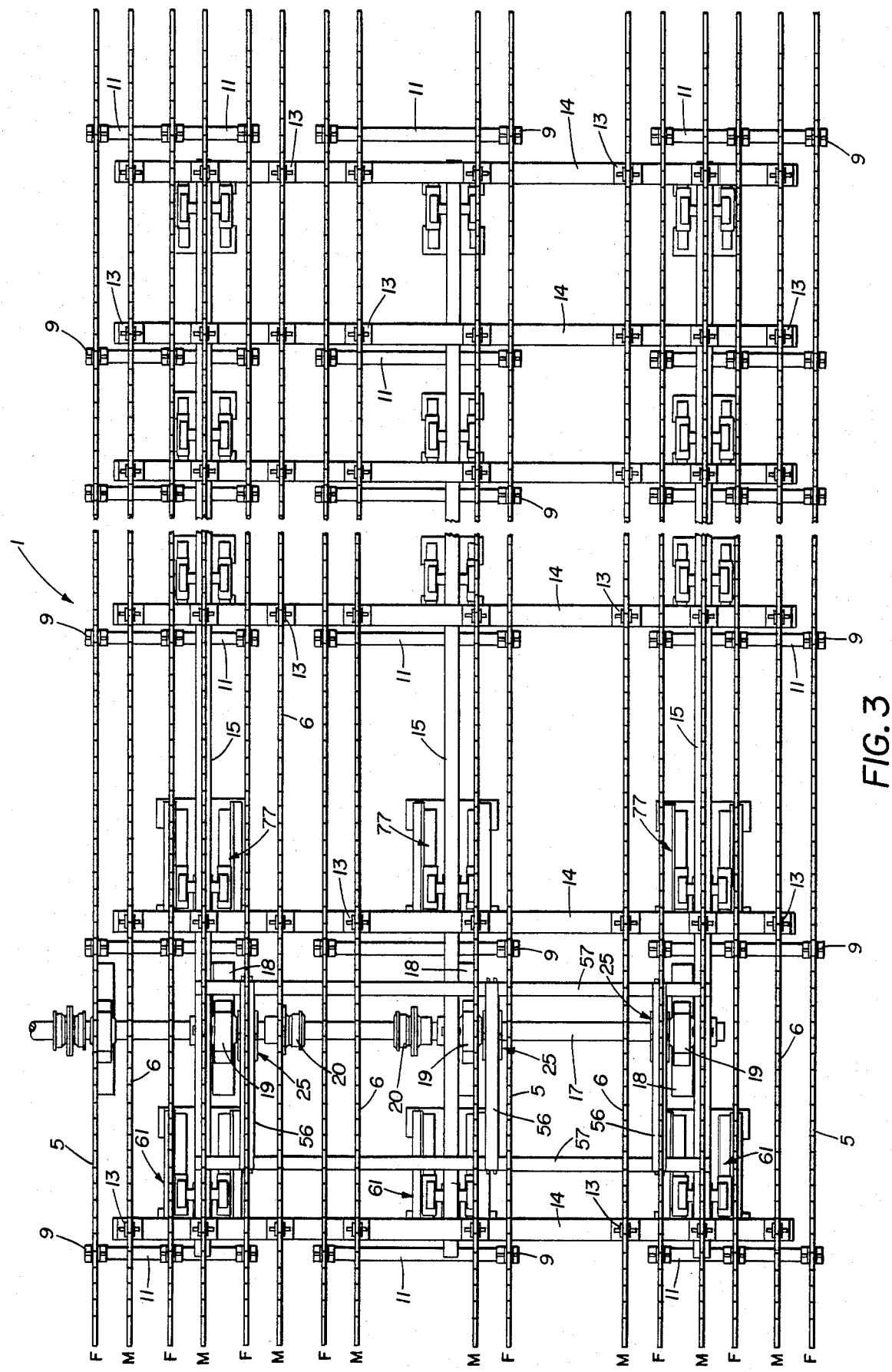
FIG. 3 is a fragmentary top plan view of the improved cooling bed as shown in FIG. 1.

The improved cooling bed construction is indicated generally at 1, and is shown in assembly in FIGS. 1, 2 and 3. Cooling bed 1 transports a plurality of heated, rolled material, preferably cylindrical-shaped bars 2 from a deposit end to a discharge end. Bars 2 are deposited on the entrance end of cooling bed 1 by some type of deposit mechanism 3 and are advanced along the bed toward the discharge end. This travel enables the heated bars to be cooled by the ambient temperature until they are discharged onto a discharge chute 4 or similar collection mechanism located adjacent the discharge end of the cooling bed.

Bed 1 includes a plurality of fixed notched beams 5 and a plurality of similarly shaped, movable notched beams 6 which are interposed between fixed beams 5. The particular cooling bed construction shown in the drawings consists of eight fixed beams 5 which are indicated in FIGS. 2 and 3 by the letter "F" and eight movable beams 6 indicated by the letter "M". The number of fixed and movable beams 5 and 6 may vary depending upon the particular cooling application for which cooling bed 1 is constructed.

Notched beams 5 and 6 extend in a longitudinal, horizontal, parallel relationship with respect to each other. The beams are formed with a series of V-shaped notches, indicated generally at 8 which are shown particularly in FIG. 10 and described in greater detail below. Notches 8 are formed in the top edges of beams 5 and 6 and extend generally throughout the longitudinal length of the beams.

Fixed beams 5 are mounted on a plurality of spaced support brackets 9 which are attached to the tops of a plurality of vertical H-shaped beams 10. Vertical beams 10 are spaced longitudinally and transversely along cooling bed 1 as shown in FIGS. 1, 2 and 3. Beams 10 are connected by transversely extending reinforcing channels 11 to provide sufficient stability thereto.

Figure 4:
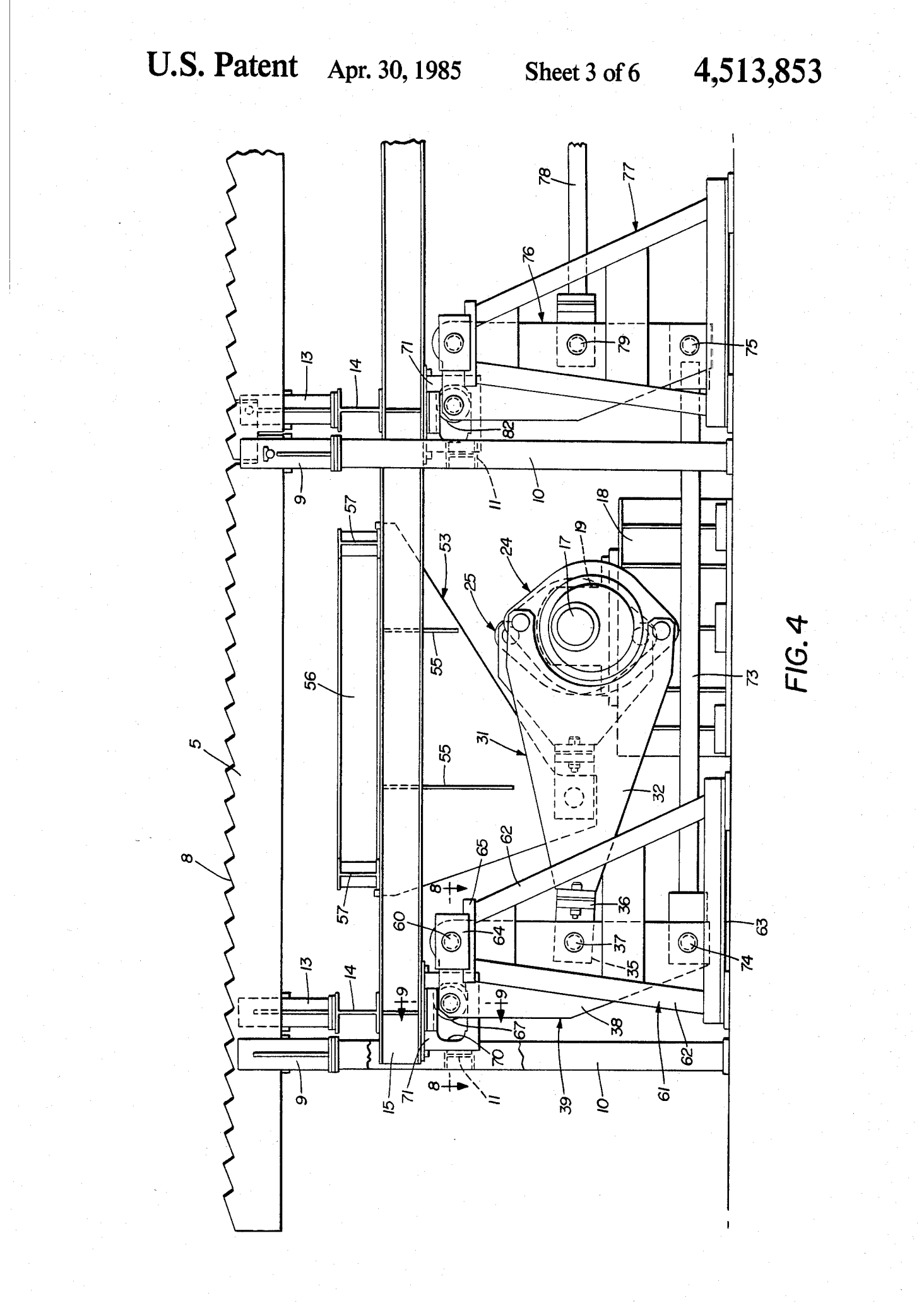

Movable beams 6 are mounted in a plurality of support brackets 13 which are secured to a plurality of transversely extending I-beams 14 (FIGS. 3 and 4). Beams 14, in turn, are secured to a plurality of longitudinally extending I-beams 15 referred to throughout as motion beams. Three motion beams 15 are used for the particular cooling bed 1 shown in the drawings and described below. Both fixed and movable notched beams 5 and 6 are formed by a plurality of notched beam sections which are joined at various support brackets 9 and 13 as shown in FIG. 4. These multiple sections and joints provide for expansion and contraction of the notched beams due to the heating and cooling of the beams by the transfer of heat from the heated bars 2.

In accordance with one of the features of the invention, an improved drive system moves motion beams 15 and correspondingly movable beams 6, through circular paths for advancing bars 2 along fixed beams 5. The improved drive system includes a single drive shaft 17 which extends transversely beneath beams 5 and 6, FIG. 2). Shaft 17 is supported on a plurality of spaced pedestals 18 and rotatably mounted thereon by bearing assemblies 19. Drive shaft 17 is formed by a plurality of shaft sections which are joined by couplers 20. Shaft 17 is rotated by a reversible electric drive motor 21 through a gear reducer 22.

Figure 5:
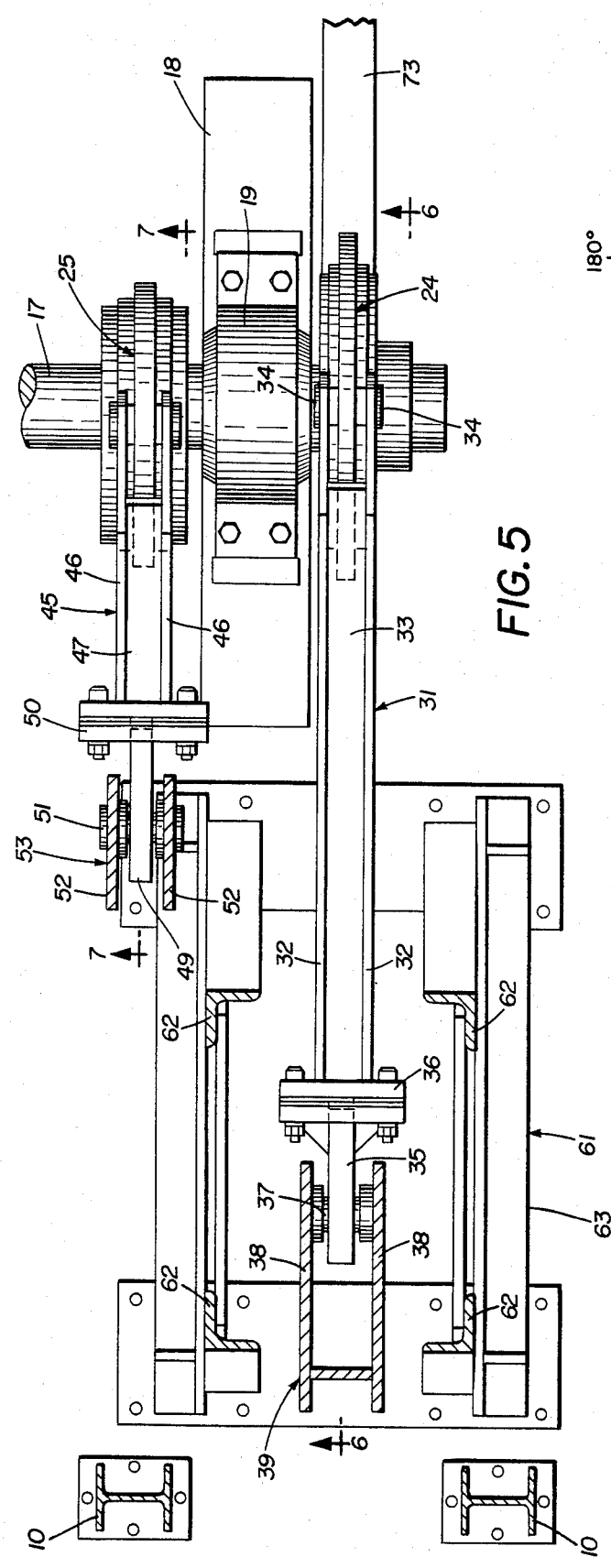
FIG. 5 is an enlarged fragmentary sectional view taken on line 5—5, FIG. 1.

In further accordance with the invention, a plurality of eccentric pairs, each pair consisting of a vertical and horizontal eccentric 24 and 25, respectively, are mounted at spaced intervals along shaft 17. There are three eccentric pairs for the particular cooling bed shown in the drawings, each associated with a respective motion beam 15. One of the eccentric pairs is shown in FIG. 5 with vertical eccentric 24 being shown in detail in FIG. 6 and horizontal eccentric 25 being shown in detail in FIG. 7. Each vertical eccentric 24 includes an eccentric disc 27 which is connected to shaft 17 by a plurality of keys 28. Eccentric disc 27 is rotatably mounted with respect to a generally oval-shaped plate 29 by a bearing ring 30.

A lever arm, indicated generally at 31 (FIGS. 5 and 6) is connected to eccentric plate 29 and extends outwardly therefrom. Arm 31 consists of a pair of spaced plates 32 connected by intervening reinforcing ribs 33. Lever arm 31 is pivotally connected to oval-shaped plate 29 at two locations diametrically opposite each other by pins 34. The extended end of lever arm 31 is connected to a plate 35 by a coupler 36. Plate 35 is pivotally connected by a pin 37 to a pair of spaced plates 38 of a bellcrank which is indicated generally at 39.

Each horizontal eccentric 25 (FIG. 7) includes an eccentric disc 41 secured to shaft 17 by keys 42. Eccentric disc 41 is rotatable with respect to an oval-shaped plate 43 by a bearing ring 44. A lever arm indicated generally at 45 is pivotally connected to oval plate 43 by a pair of diametrically opposite pins 48. Arm 45 consists of a pair of spaced plates 46 connected by internal reinforcing members 47. Lever arm 45 is connected to a plate 49 by a coupler 50. Plate 49, in turn, is pivotally mounted by a pin 51 to a pair of spaced plates 52 of a main horizontal push-pull connecting plate, indicated generally at 53.

Each horizontal push-pull plate 53 consists of spaced plates 52 which have a plurality of vertically extending stiffening plates 55 (FIG. 4). Spaced plates 52 are connected at their top ends by a beam 56 which is connected to a pair of transversely extending beams 57. Beams 57 extend generally throughout the transverse length of cooling bed 1, as shown in FIG. 3, and are conected to motion beams 15.

Each bellcrank 39 (FIGS. 4, 5 and 8) is pivotally mounted by a pin 60 at one corner of its upper end on the top of a vertical stand indicated generally at 61. Stand 61 includes a plurality of angled converging legs 62 which extend upwardly inwardly from a rectangular-shaped base 63. Pivot pin 60 is rotatably supported in a pair of bearing blocks 64 which are mounted in a pair of brackets 65 that are connected to the upper ends of legs 62. A roller 67 is rotatably mounted by a pin 68 to the swinging upper corner of bellcrank 39, as shown in FIGS. 8 and 9. Roller 67 is movably mounted within a horizontally extending slot 70 formed in a roller guide block 71. Blocks 71 are connected to and extend downwardly from the bottom of motion beams 15 (FIG. 4).

Each vertical eccentric 24 is operatively connected to bellcrank 39 by plate 35 and pivot pin 37 generally intermediate the top and bottom edges of bellcrank 39, as shown in FIG. 4. A bellcrank motion transfer rod 73 is pivotally mounted by a pin 74 to the bottom end of bellcrank plates 38 and extends horizontally therefrom in a direction parallel with the longitudinal axis of cooling bed 1 and correspondingly notched beams 5 and 6. Motion transfer rod 73 is pivotally connected by pin 75 to the bottom of another bellcrank indicated generally at 76.

Each bellcrank 76 is pivotally mounted on a vertical stand indicated generally at 77. Bellcranks 76 and vertical stands 77 are similar to bellcranks 39 and vertical stands 61. Another bellcrank motion transfer rod 78 is pivotally connected by a pin 79 to each of the bellcranks 76 intermediate the upper and lower ends thereof at the same general position as the connections between vertical eccentrics 24 and bellcranks 39 by pins 37. The only difference between bellcranks 39 and 76 is that second motion transfer rods 78 are connected to bellcranks 76 at the same location as are lever arms 31 of eccentrics 24. Each motion transfer rod 78 extends horizontally longitudinally along and beneath the cooling bed and is connected to another bellcrank 80 as shown in FIG. 1. Bellcranks 80, in turn, are pivotally mounted on other vertical stands 81. There are a plurality of these bellcranks 76 and 80 extending along the longitudinal length of the cooling bed for the purpose of imparting the vertical motion component to motion beams 15 as described more fully below. Bellcranks 76 and 80 are pivotally mounted at their upper ends as are bellcranks 39 and each includes a roller 82 similar to roller 67, which is located within a roller guide block 71.

The operation of eccentrics 24 and 25 and their resulting effect on movable beams 6 is as follows. Rotation of single drive shaft 17 in a counterclockwise direction, as shown in FIGS. 4, 6 and 7, will impart a generally horizontal reciprocating motion on lever arms 31 and 45 indicated by arrows A and B in FIGS. 6 and 7, respectively. This reciprocating motion is transferred through pivot pins 37 and 51 to bellcranks 39 and push-pull plates 53. The horizontal push-pull motion on plates 53 is transmitted through beams 56 and 57 to motion beams 15 to impart a horizontal motion component thereto.

The generally horizontal reciprocal motion of lever arms 31, which is applied to bellcranks 39, will impart a generally vertical motion on rollers 67 due to pivotal connections 60 of the opposite corners of bellcranks 39 on stands 61. This vertical motion of rollers 67 is then transmitted as a vertical motion component to motion beams 15 due to the sliding rolling connection between rollers 67 within slots 70 of roller guide blocks 71.

The simultaneous application of a horizontal motion component and a vertical motion component on motion beams 15 will result in a circular motion being applied to beams 15. This circular motion on motion beams 15, in turn, is applied to notched beams 6 due to the connection therebetween by transverse beams 14 and mounting brackets 13. Thus, a circular motion is imparted to movable notched beams 6 by the combined action of vertical and horizontal eccentrics 24 and 25, respectively. The three horizontal eccentrics 25 which are spaced transversely along shaft 17 supply all of the horizontal motion force on beams 15. However, the longitudinally spaced bellcranks 39, 76 and 80 and their associated rollers 67 and 82 impart the vertical motion component and force at longitudinally spaced intervals along beams 15 due to the length of the cooling bed. The number of individual bellcranks 39, 76 and 80 and associated vertical stands 61 and 77 depend upon the length and width of the particular cooling bed. This vertical motion component is applied in unison throughout cooling bed 1 due to the connection between the individual bellcranks by motion transfer rods 73 and 78.

Figure 10:
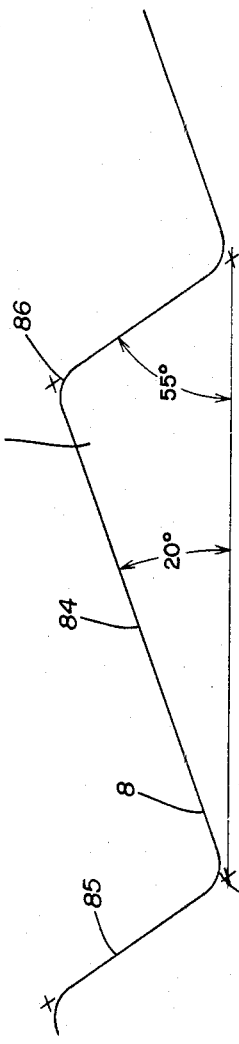
FIG. 10 is an enlarged fragmentary elevational view showing the notch configuration of the fixed and movable beams.

The particular shape and configuration of V-shaped notches 8 is shown particularly in FIG. 10. Each V-shaped notch 8 is formed by a pair of sloped sides 84 and 85. Side 84 is longer in length than side 85 and has a smaller angle of inclination with respect to the horizontal than does steeper sloped side 85. Longer side 84 will have an angle of inclination of approximately 20° with respect to the horizontal and extends downwardly in the forward or bar advance direction of beam movement which is toward the left in FIGS. 1, 3 and 10. Shorter steeper side 85 extends downwardly toward the horizontal in a rearward direction opposite to that of the bar movement and has an angle of inclination of approximately 55° with respect to the horizontal.

Also, the spacing or pitch between peaks 86 and valleys 87 of notches 8 will be equal throughout the longitudinal length of beams 5 and 6 and will be approximately twice the diameter of imaginary circle 89 which illustrates the circular path of each movable beam 6.

In accordance with one of the features of the invention, rotation of drive shaft 17 in a counterclockwise direction, referring to FIGS. 1, 4, 6 and 7, will reciprocate movable beams 6 throughout their circular paths and advance bars 2 along the cooling bed. Each complete rotational cycle of shaft 17 and correspondingly of eccentric discs 27 and 41 will move beams 6 through a complete circular path and correspondingly will advance each bar 2 one notch toward the discharge end.

Figure 11:
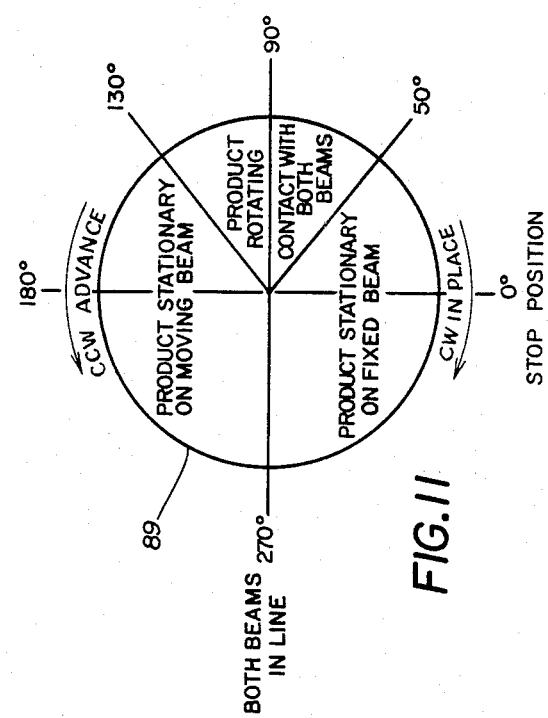
FIG. 11 is a diagrammatic motion diagram of the movable beam throughout a cycle of 360°.
Figure 12:
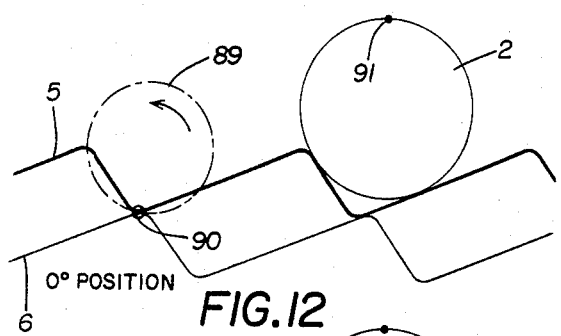
FIGS. 12 through 17 are diagrammatic views showing the various positions of the movable beam with respect to the fixed beam and the travel path of a bar being advanced along the cooling bed.
Figure 13:
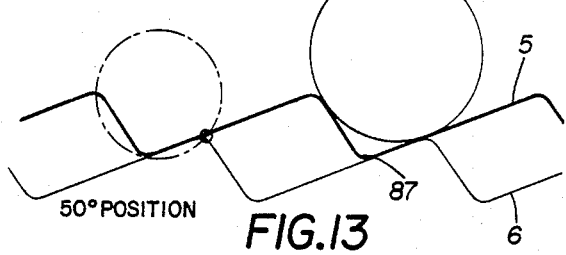
Figure 19:
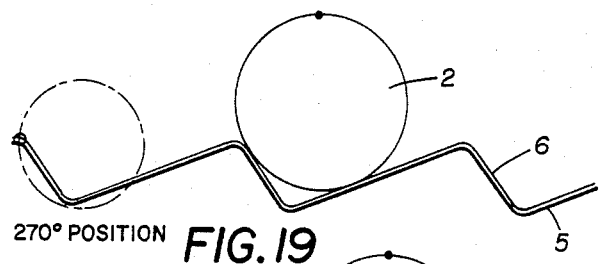
Figure 14:
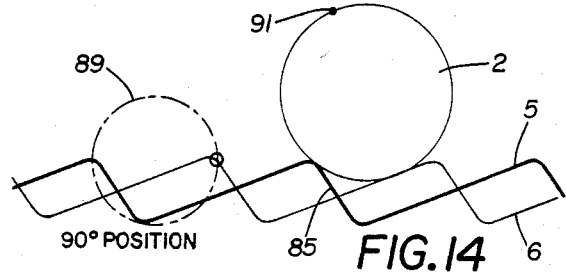
Figure 20:
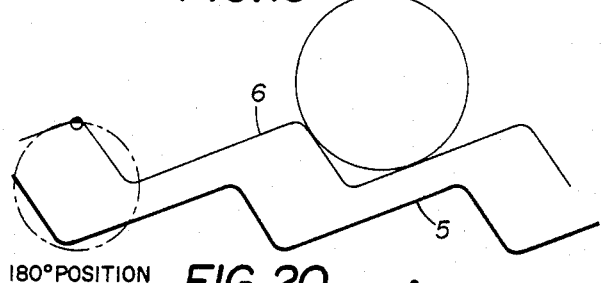
Figure 15:
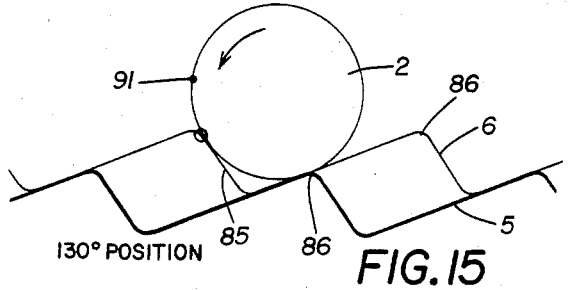
Figure 21:
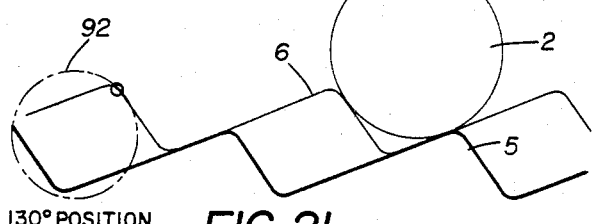

This forward movement of each bar 2 from one notch to the succeeding notch upon a single rotation of shaft 17 and movement of movable beams 6 through one complete cycle is shown diagrammatically in FIGS. 12-17 with reference to FIG. 11. FIG. 11 shows the relationship between fixed and movable beams 5 and 6 and bars 2 supported thereby during a complete rotational cycle of shaft 17 and correspondingly of movable beams 6. A fixed beam 5 is illustrated in heavier lines in FIGS. 12-23 than is a movable beam 6. Imaginary circle 89 shown in dot-dash lines in FIGS. 12-14 represents the circular path that movable beam 6 will travel throughout a complete cycle. This is shown by the circular path a particular point 90 on beam 6 will travel during a complete rotational cycle. The position of movable beam 6 shown in FIG. 12 corresponds to the stop or 0° position shown in the diagram of FIG. 11 at which position bar 2 is completely supported by fixed beam 5.

Figure 16:
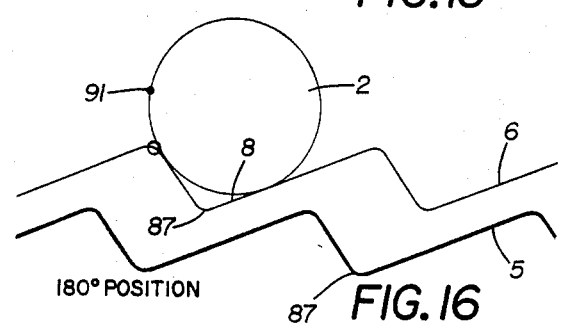
Figure 22:
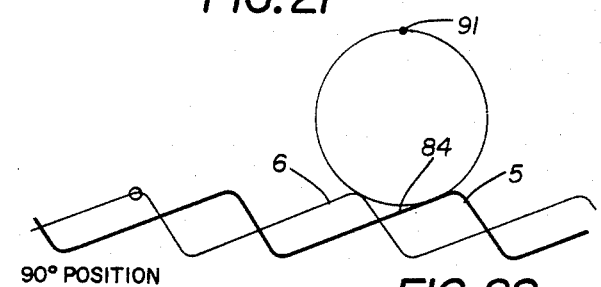
Figure 17:
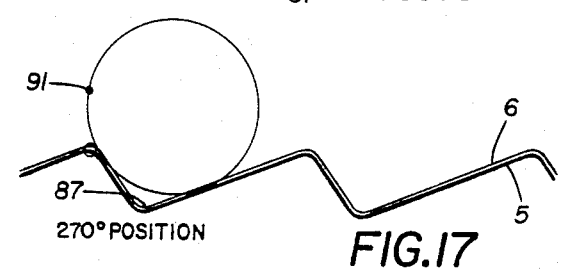
Figure 23:
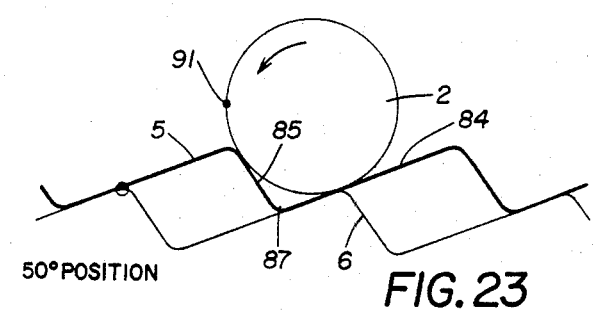

As shaft 17 begins to rotate in a counterclockwise direction, each movable beam 6 will rotate approximately 50° to the position of FIG. 13, at which position movable beam 6 begins to contact bar 2. As beam 6 rotates from the 50° position of FIG. 13 to the 90° position of FIG. 14, bar 2 will be rotated approximately 20° by the arcuate motion of beam 6 on which it rests. Continued rotational movement of beam 6 beyond the 90° position of FIG. 14 will cause bar 2 to continue to rotate in a forward counterclockwise direction until it comes to rest against sloped surface 85 of movable beam 6. Bar 2 will rotate approximately 90° when moving from the position of FIG. 13 to that of FIG. 15 as shown by point 91 indicated on bar 2. Continued rotation of beam 6 will carry bar 2 from contact with crest 86 of fixed beam 5 to its resting place in the valley 87 of adjacent notch 8 without rotation as shown in FIGS. 16 and 17 wherein the V-shaped notches of beams 5 and 6 are in alignment of each other.

Thus, FIGS. 12-17 illustrate diagrammatically the operation of movable beam 6 wherein it picks up bar 2 and carries it from its resting place in the valley of one notch and carries it forwardly to a resting place in the valley of the adjacent notch while rotating the bar 90°.

In accordance with another of the main features of the invention, rotation of shaft 17 in a clockwise direction or in the opposite direction as it is rotated when advancing bars 2 along cooling bed 1, will rotate bars 2 in their respective notches 8 without advancement. This in place rotation prevents the bars from bending should the bars become stationary on the cooling bed. For example, should the discharge station be filled or experience a malfunction, the forward movement of the bars can be stopped easily by reversing the rotation of drive motor 21 and the bars rotated within their respective notches. This in place rotation is illustrated in FIGS. 18-23 with reference to the motion diagram of FIG. 11.

Figure 18:
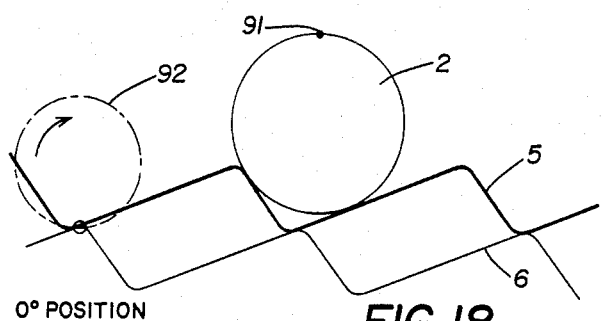
FIGS. 18 through 23 are diagrammatic views similar to FIGS. 12 through 17 showing the positions of the movable beam with respect to the fixed beam when the drive shaft is rotated in an opposite direction to rotate a bar within its notch without advancing the same along the cooling bed.

FIG. 18 shows a bar 2 in the same stop or 0° position as FIG. 12. Rotation of drive shaft 17 in a clockwise direction will rotate movable beams 6 in the same circular path as when advancing the beams except in a reverse direction as shown by imaginary dot-dash line circle 92, FIG. 18. Rotation of beam 6 from the stop position of FIG. 18 to the in-line or 270° reference position of FIG. 19 will not affect bar 2. However, continued rotation of beam 6 from the position of FIG. 19 to that of FIG. 20 will cause beam 6 to pick up bar 2 and carry it without rotation to the 130° reference position of FIG. 21. Continued movement of beam 6 from the 130° reference position of FIG. 21 to the 90° reference position of FIG. 22 will have no appreciable affect on bar 2 since it will remain supported between both beams 5 and 6. As movable beam 6 moves from the 90° position of FIG. 22 toward the 50° position of FIG. 23, bar 2 will roll downwardly along surface 84 of fixed beam 5 until it reaches its bottom-most position in valley 87 where it rests against both sloped surfaces 84 and 85 of the fixed beam notch. Bar 2 will rotate approximately 90° in rolling from the position of FIG. 22 to the position of FIG. 23. Rotation of movable beam 6 from the position of FIG. 23 back to the starting position of FIG. 18 will have no affect on bar 2 since it will not be in contact with bar 2. Therefore, so long as shaft 17 and movable beam 6 are rotated in the clockwise direction, each bar 2 will rotate within its respective notch 8 without advancement along the cooling bed.

It is the particular configuration of V-shaped notches 8 in combination with the particular drive mechanism of the eccentrics which impart a circular motion to movable beams 6 that achieves the desired results of improved cooling bed 1. The angles of inclination of notch sides 84 and 85 of 20° and 55°, respectively, have been found to be quite satisfactory for achieving the desired results. However, these angles can be varied without affecting the concept of the invention.

The lengths of sloped notch sides 84 and 85 also have a bearing on the movement of bars 2 in that longer lengths would provide greater or smaller amounts of rotation of the bars during movement of beams 6 than the preferred 90°. For example, if side 84 was longer, it would enable bar 2 to rotate more than 90° when subjected to in-place rotation due to the greater amount of time and length of surface along which bar 2 will roll in returning to rest in the valley of its notch. Also, the pitch or distance between the adjacent peaks or between the adjacent valleys of notches 8 is important since this distance in combination with the angles of slope of sides 84 and 85 will determine the lengths of sloped sides 84 and 85. A pitch of 8 inches has been found to be entirely satisfactory when bars 2 have a diameter of 5½ to 6 inches. This combination together with the angles of inclination of 20° and 55° will provide a bar rotation of approximately 90° during advanced movement or in-place rotation. It is readily seen by anyone skilled in the art that modifications of these angles and distances can achieve various degrees of rotation and would be adjusted according to the particular diameter of a bar to be moved by the improved cooling bed.

Accordingly, the improved cooling bed provides a construction which uses a single drive shaft for advancing the round bars along the cooling bed while rotating the same, in addition to providing the feature of rotating the bars within their respective notches without advancement, preventing bending of the bars due to their heated state.

The improved cooling bed construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cooling bed is constructed and used, the characteristics of the construction, and the advantageous, new and useful results obtained; the new and useful structures, devices, elements, arrangements, parts, and combinations, are set forth in the appended claims.

We claim:

1. In an improved cooling bed construction of the type having a series of parallel, longitudinally horizontally extending notched beams, certain of which are fixed and certain others being reciprocally movable for advancing elongated bar material progressively along the fixed beams toward a discharge end, said improvement including: a single drive shaft extending transversely beneath the beams, reversible electric motor means for rotating said single drive shaft in forward and reverse directions, and first and second eccentric means mounted on the drive shaft and operatively connected to the movable beams for imparting reciprocal movement to the movable beams upon rotation of said drive shaft; the first eccentric means including a first disc eccentrically mounted on the drive shaft, a lever arm movably mounted on and reciprocally movable by the first disc, and a pivotally mounted bellcrank connected to and pivoted by the lever arm and operatively engageable with the movable beams for imparting a vertical raising and lowering motion on said movable beams upon rotation of the drive shaft; the second eccentric means including a second disc eccentrically mounted on the drive shaft and a lever arm movably mounted on and reciprocally movable by the second disc and operatively connected to the movable beams for imparting a horizontal reciprocating motion component to said beams upon rotation of the drive shaft; a series of notch means formed on the fixed and movable beams for holding the bars of material and for advancing said bars toward the discharge end upon reciprocal movement of the movable beams by rotation of the drive shaft in one direction and for turning the bars within their respective notch means without advancement upon rotation of the drive shaft in an opposite direction; and each of said notch means having a first surface extending downwardly in the forward direction of travel and a second surface extending upwardly in the forward direction of travel with said second surface having a smaller length and greater angle of slope than said first surface.

2. The improved cooling bed construction defined in claim 1 in which the notch means of the fixed and movable beams are similar to each other in size and configuration.

3. The improved cooling bed construction defined in claim 1 in which the first sloped surface has an angle of inclination of approximately 20° with respect to the horizontal and the second sloped surface has an angle of inclination of approximately 55° with respect to the horizontal.

4. The improved cooling bed construction defined in claim 3 in which the distance between the crests of the notches are equal.

5. The improved cooling bed construction defined in claim 1 in which the movable notched beams are mounted on a plurality of spaced transversely extending cross beams; in which the transverse cross beams are mounted on a plurality of longitudinally extending motion beams; and in which the eccentric means operatively engage the motion beams for imparting a reciprocating motion to the movable notched beams.

6. The improved cooling bed construction defined in claim 5 in which the bellcrank is operatively connected to a plurality of bellcranks which are operatively engaged with the motion beam by other rollers upstream of the single drive shaft.

7. The improved cooling bed construction defined in claim 6 in which the bellcranks are operatively connected by generally horizontally extending rods.

8. The improved cooling bed construction defined in claim 7 in which each of the bellcranks includes a vertically extending plate which is pivotally connected at a first upper corner to a stand located beneath the notched beams; in which the lever arm is pivotally connected to the bellcrank plate intermediate the upper and lower ends thereof; and in which the horizontal connecting rod is pivotally connected to a lower end of the bellcrank plate.

9. The improved cooling bed construction defined in claim 8 in which a motion beam engaging roller is rotatably mounted on a second upper corner of the bellcrank plate spaced from the pivotal mounting location of the first upper end.

10. The cooling bed construction defined in claim 1 in which the beam notches are V-shaped; and in which the pitch of the V-shaped notches is greater than the diameter of the round bars to be moved by the cooling bed.

11. The cooling bed construction defined in claim 1 in which a roller is mounted on one end of the bellcrank and is operatively engageable with the movable beams for imparting a vertical raising and lowering motion component to said movable beams.

12. The improved cooling bed construction defined in claim 1 in which a plate is operatively connected to the movable beams and lever arm for imparting a horizontal reciprocating motion component to the movable beams upon rotation of the drive shaft.

* * * * *